March 27, 1951  N. J. SIEGRIST  2,546,874

LINING FOR COFFEE MAKING INSTRUMENTALITIES

Filed June 18, 1947

INVENTOR,
NELSON J. SIEGRIST,
BY

Patented Mar. 27, 1951

2,546,874

UNITED STATES PATENT OFFICE 2,546,874

LINING FOR COFFEE-MAKING INSTRUMENTALITIES

Nelson J. Siegrist, Neosho, Mo.

Application June 18, 1947, Serial No. 755,528

2 Claims. (Cl. 210—162)

This invention relates to coffee percolator attachments, and particularly to a lining for the cup or coffee holding element of such coffee makers, an object of the invention being to provide a novel fabric lining which restrains the passage of coffee grounds to the interior of the coffee pot and facilitates the collection and removal of the coffee grounds when the process is completed.

It is an object of this invention to provide a lining comprising a coarsely woven fabric, the warp and weft threads of which are thin or fine and comparatively widely separated, and to which a facing is applied, which facing is in the nature of cotton gauze, the same being known in the trade as filter cloth. The fabric constitutes a base or support for the lamina of cotton which is somewhat of the character of cotton gauze, through which the fluid can readily pass, though it is sufficiently dense to arrest the coffee grounds or fine particles so that the resultant coffee brew is free of grounds, and when the lining is removed from the strainer, all of the solid matter which was introduced for making the coffee is removed or carried by the lining which is of such an inexpensive character that it can be discarded, though, under some conditions, it may be freed of the grounds by rinsing and manipulation.

It is a further object of this invention to provide a lining of the character indicated which has proven efficient and satisfactory in use and is comparatively inexpensive.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which.

Figure 1:
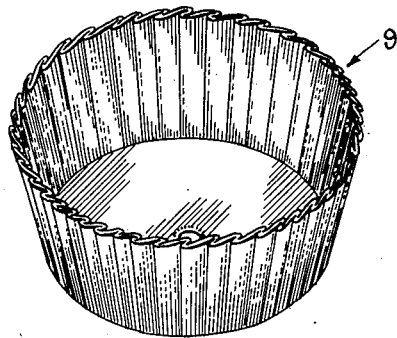
Figure 1 illustrates a view in perspective of the percolator strainer with the lining applied.
Figure 2:
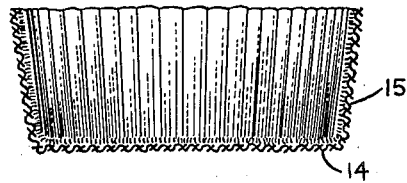
Figure 2 illustrates a sectional view of the lining.
Figure 3:
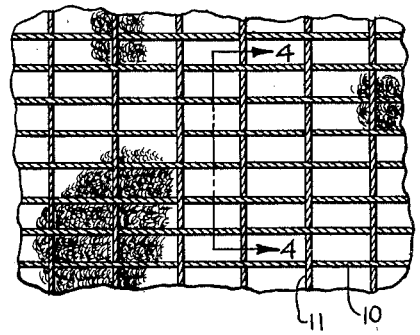
Figure 3 illustrates a plan view of the base fabric on an enlarged scale.
Figure 4:
Figure 4 illustrates a sectional view of the lining on an enlarged scale.
Figure 5:
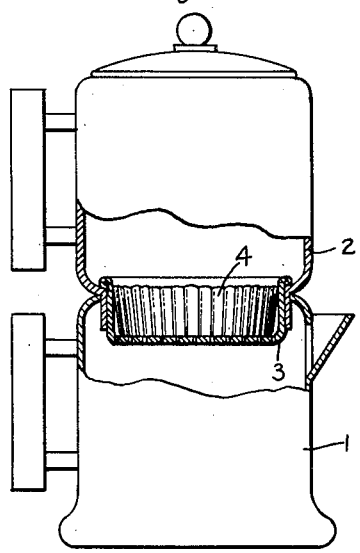
Figure 5 illustrates a view in elevation, partly in section, showing the invention applied to a dripolator.
Figure 6:
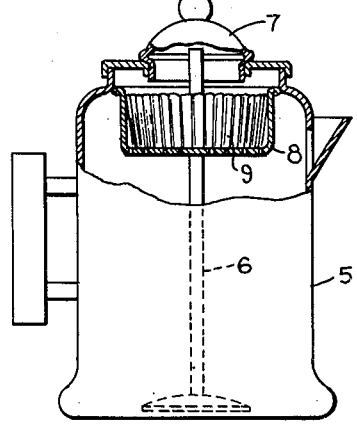
Figure 6 illustrates a view in elevation of a percolator coffee pot with the invention applied to that type.

In these drawings 1 denotes a dripolator coffee pot having the water reservoir 2 at the top thereof and the interposed strainer 3 with a lining 4 embodying the invention applied thereto, whereas 5 denotes a percolator coffee pot having the usual water pipe 6, cover 7 and strainer 8, through which the pipe 6 projects, and these, of course, are more or less conventional in character and need not be described in detail. The lining 9, as applied to this form, has an aperture in its center for the reception of the water tube. The foregoing description indicates the manner of use of the lining which, in the present embodiment of the invention, comprises a fabric of woven threads 10 and 11 which may be regarded as the warp and weft threads and, in the production of the base fabric, these threads are relatively thin and widely spaced. The base fabric is generally identified by the numeral 12 in Figure 4 which is exaggerated as to the size of the threads, and the facing 13 on the base fabric is relatively thin and has the characteristics heretofore referred to as cotton gauze. The lining may be of generally circular form, folded so that it has a bottom portion 14 with a side flange 15 which conforms to the bottom and side of the usual coffee making strainer, though it being thin and flexible, the lining can be made to conform to practically any strainer with which it is to be used.

It is obvious from the foregoing that when the lining is used in the strainers indicated, the fluid, that is to say the water which is being used for making the coffee, will readily pass through the lining and strainer and the solid materials or grounds will be arrested and held by the lining when manipulating in the manner heretofore suggested.

I claim:

1. In coffee-making instrumentalities, wherein the instrumentality includes a cup-shaped member of circular contour having an open top and perforated bottom, a lining formation for lining such cup, said formation being shaped to nest within the cup with the formation overlying the internal walls of the cup, said lining formation being of ply characteristic with the outer ply formed of woven fabric having the warp and weft threads of relatively thin yarns and arranged loosely woven to thereby present the ply as having a multiplicity of openings of material dimensions and spaced by such threads, the formation having an inner ply formed of a layer of unwoven fibrous material mounted upon the outer ply to thereby form an inner layer of unwoven fibrous material presenting fine interstices dimensioned to prevent passage therethrough of the coffee grounds while permitting the passage therethrough of the brewed coffee, said formation being produced from a blank of the two-ply material with the blank shaped into the cup form and with the annular wall presenting overlying crimps, both plies of the formation being presented within each crimp.

2. A lining formation as in claim 1 characterized in that the unwoven fibrous material is of cotton source with its fibres promiscuously arranged and further characterized in that the thickness of the inner ply is materially greater than the thickness of the woven outer ply.

NELSON J. SIEGRIST.

REFERENCES CITED

The following references are of record in the file of this patent:

UNITED STATES PATENTS

| Number | Name | Date |
|---|---|---|
| 266,559 | Tyler | Oct. 24, 1882 |
| 956,832 | Seitz | May 3, 1910 |
| 2,123,326 | Biberthaler et al. | July 12, 1938 |
| 2,150,588 | Pitt | Mar. 14, 1939 |
| 2,426,720 | Weinberg | Sept. 2, 1947 |